(12) United States Patent
Everette et al.

(10) Patent No.: US 6,390,324 B1
(45) Date of Patent: *May 21, 2002

(54) MULTI-CHAMBERED CONTAINER

(75) Inventors: C. Joseph Everette, Marietta; Charles M. Brandt, Lithia Springs, both of GA (US); Richard G. Kraft, Joliet, IL (US)

(73) Assignee: Crown Cork & Seal Technologies Corporation, Alsip, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/313,390

(22) Filed: May 18, 1999

Related U.S. Application Data

(62) Division of application No. 08/835,263, filed on Apr. 8, 1997, now Pat. No. 5,928,681.

(51) Int. Cl.⁷ .................................................. B65D 1/04
(52) U.S. Cl. ........................... 220/555; 220/500; 215/6
(58) Field of Search ................................ 220/855, 500, 220/516, 517; 215/6

(56) References Cited

U.S. PATENT DOCUMENTS

| | | | |
|---|---|---|---|
| 2,661,870 A | 12/1953 | Huenergardt | 222/129 |
| 2,661,871 A | 12/1953 | Huenergardt | 222/129 |
| D189,938 S | 3/1961 | Heintze | D58/6 |
| D190,101 S | 4/1961 | Mangini | D58/8 |
| 3,076,573 A | 2/1963 | Thomas | 215/6 |
| 3,197,071 A | 7/1965 | Kuster | 222/94 |
| 3,337,073 A | 8/1967 | Angelo | 215/6 |
| 3,394,209 A | 7/1968 | Cheney | 425/526 |
| 3,394,861 A | 7/1968 | Truax | 229/15 |
| D214,549 S | 7/1969 | Ledewitz | D9/1 |
| 3,474,927 A | 10/1969 | Bowles | 215/1 |
| 3,535,411 A | 10/1970 | Bowles et al. | 425/525 |
| 3,581,940 A | 6/1971 | Cella | 222/94 |
| 3,705,661 A | 12/1972 | Davis | 215/6 |
| 3,724,987 A | 4/1973 | Schiemann | 425/526 |
| 3,729,553 A | 4/1973 | Gold et al. | 424/44 |
| 3,866,800 A | 2/1975 | Schmitt | 222/94 |
| D244,992 S | 7/1977 | Van der Veken | D9/167 |
| 4,147,270 A | 4/1979 | Brandon, Jr. et al. | 220/22 |
| 4,166,833 A | 9/1979 | Schurman | 425/525 |
| D263,118 S | 2/1982 | Weekman | D9/341 |
| 4,423,000 A | 12/1983 | Teraoka | 264/526 |

(List continued on next page.)

FOREIGN PATENT DOCUMENTS

| | | |
|---|---|---|
| CA | 2039579 | 4/1991 |
| GB | 2230756 A | 10/1990 |
| JP | 5 9-232828 A | 6/1983 |

OTHER PUBLICATIONS

Figures 1 though 6 depicting a prior art container (Fig. 4–6 depict a top view of the container after removal of the trigger sprayer shown in Figure 1).

*Primary Examiner*—Joseph M. Moy
(74) *Attorney, Agent, or Firm*—Woodcock Washburn LLP

(57) ABSTRACT

In a process for making a multi-chambered container that is lightweight, relatively inexpensive to produce, and that requires less external reinforcement against flexure than conventional multi-chambered containers do, a parison is heated and inflated to form the container. Further, first and second pinched-in areas are fashioned in the sidewall of the container. The first pinched-in area includes first and second wall portions that extend inwardly toward an interior of the main body of the container, and a first end wall portion connecting the first and second wall portions. The second pinched-in area includes third and fourth wall portions that extend inwardly toward an interior of the main body, and a second end wall portion connecting the third and fourth wall portions. The first end wall portion is joined to said second end wall portion so as to define separate compartments within said main body, and wherein the first end wall portion is laterally offset from the second end wall portion, whereby the flexibility of the main body about the joint of the first and second wall portions is minimized. In the next step, the container is cooled.

14 Claims, 6 Drawing Sheets

U.S. PATENT DOCUMENTS

| | | | |
|---|---|---|---|
| 4,534,509 A | 8/1985 | Holzner | 239/34 |
| D280,599 S | 9/1985 | Green | D9/341 |
| D287,571 S | 1/1987 | Hutchins | D9/313 |
| D288,526 S | 3/1987 | Parad | D9/341 |
| D290,225 S | 6/1987 | Carlson | D9/341 |
| 4,798,288 A | 1/1989 | Holzner | 206/222 |
| 4,884,703 A | 12/1989 | O'Meara | 215/6 |
| 4,964,539 A | 10/1990 | Mueller | 222/94 |
| 4,998,671 A | 3/1991 | Leifheit | 239/44 |
| 5,088,627 A | 2/1992 | Musel | 222/145 |
| 5,154,917 A | 10/1992 | Ibrahim | 424/7.1 |
| 5,232,108 A | 8/1993 | Nakamura | 425/525 |
| 5,252,312 A | 10/1993 | Gentile et al. | 424/44 |
| 5,289,950 A | 3/1994 | Gentile | 222/142.3 |
| 5,353,927 A | 10/1994 | Stupar et al. | 206/219 |
| 5,363,990 A | 11/1994 | Fillmore | 222/135 |
| 5,398,828 A | 3/1995 | Valyi | 215/100 A |
| 5,407,278 A | 4/1995 | Beer | 383/38 |
| 5,447,236 A | 9/1995 | Perry et al. | 206/541 |
| 5,482,170 A | 1/1996 | Semersky et al. | 215/6 |

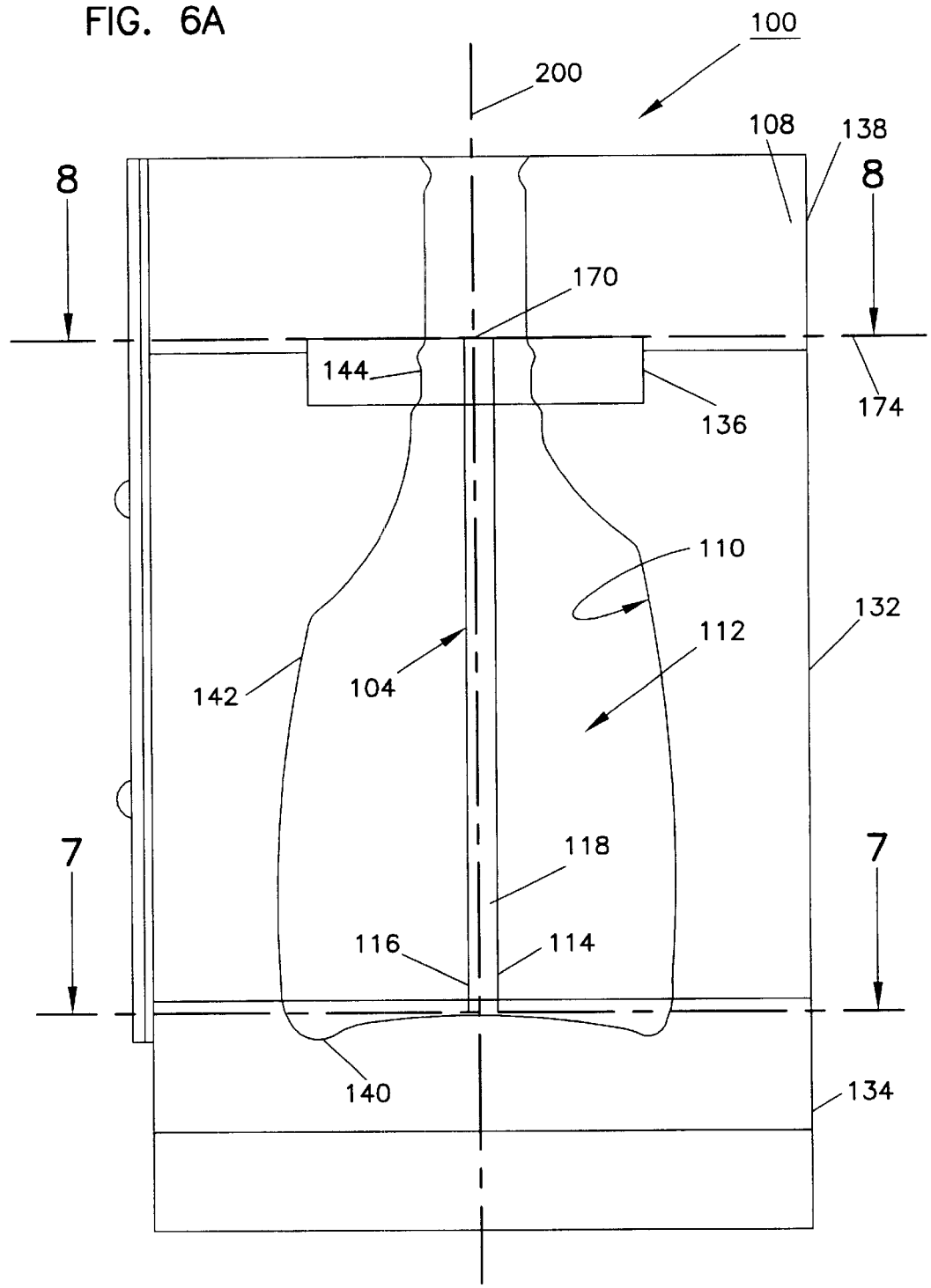

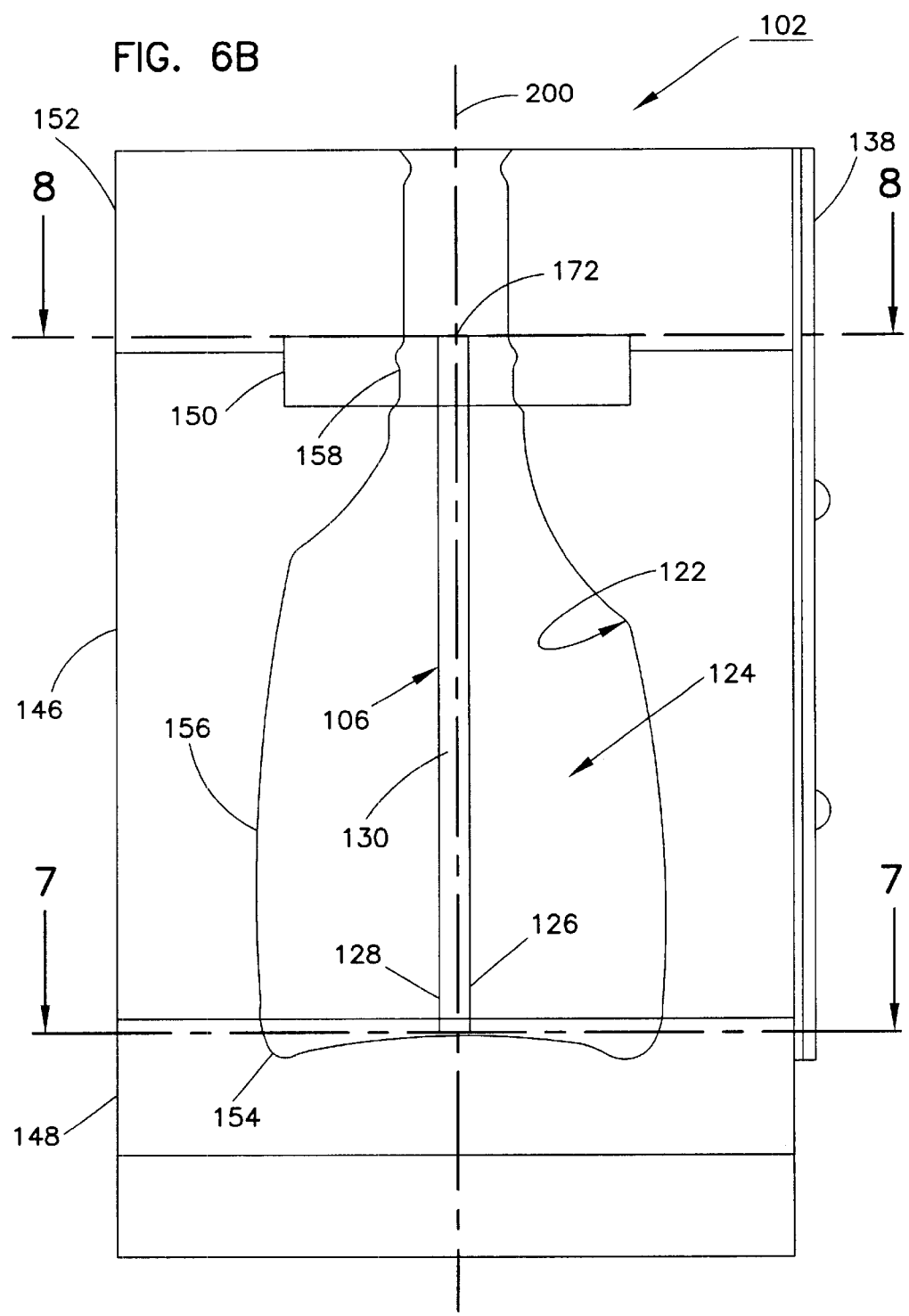

MULTI-CHAMBERED CONTAINER

This application is a divisional of application Ser. No. 08/835,263 filed Apr. 8, 1997, now U.S. Pat. No. 5,928,681, which is related to U.S. Pat. application Ser. No. 08/808,184 filed Feb. 28, 1997, now U.S. Pat. 5,971,197.

BACKGROUND OF THE INVENTION

1. Field of the Invention

This invention relates broadly to the field of containers, such as the plastic containers that are commonly used for packaging solid and liquid detergents, cleaners and foodstuffs. More specifically, this invention pertains to an improved process for making a dual chambered container that is lightweight, strong and inexpensive to produce.

2. Description of the Prior Art

Plastic containers are in wide use throughout the United States and the world for packaging virtually every type of liquid and solid material, for both commercial and household applications. The detergent industry, for example, has turned increasingly to plastic containers for packaging such products as bleach, soap, sanitizing agents, and polishes. Plastic is relatively inexpensive, will not shatter when dropped, and is recyclable.

Some products are best packaged, for reasons of both marketability and convenience, together with one or more other products in a container that has more than one chamber, or in a pair of containers that are joined together in some manner. With respect to the latter mentioned option, packaging is known that includes two separate containers that are joined together by a common closure having two openings. U.S. Pat. Nos. 5,289,950 and 5,252,312 disclose packaging of this type. These type of containers are relatively expensive to make because of the complexity of the manufacturing process, require a relatively large amount of plastic material per volume of product that is being packaged, and are undesirable to the extent that the container's design leaves open the possibility of separation of the individual containers during use.

A basic process for producing plastic containers is through extrusion blow molding. Like other types of molding, the object of the process is to produce a hollow item via air inflation of a parison. The blow molding process involves first heating the parison, a preshaped sleeve of plastic, usually made by extrusion. The heated parison is engaged in a mold cavity formed by two mold halves and inflated with air delivered through a blow pin or needle. As the parison is inflated, it takes on the shape of the mold cavity. The polymer quickly solidifies upon contacting the cold mold, and the finished hollow article is ejected from the mold.

Other known processes for producing a plastic container having more than one chamber include those where a container is first molded as a single chambered container, and then heat sealed into separate compartments in a subsequent reforming step. Because of this second reforming and heating step, the process is more time consuming and expensive than a one-step forming process. In addition, because the compartments that are defined by the heat sealing step tend to be joined together only by a thin web of material, the resulting product tends to be overly flexible and requires reinforcement by and external device such as a special closure, a base cup or an adhesive label that is positioned to prevent relative movement between the formed compartments.

A need exists in this area of technology for an improved process for making an improved multi-chambered container that is lightweight, relatively inexpensive to produce, and that requires less external reinforcement against flexure than conventional multi-chambered containers do.

SUMMARY OF THE INVENTION

Accordingly, it is an object of this invention to provide an improved process for making an improved multi-chambered container that is lightweight, relatively inexpensive to produce, and that requires less external reinforcement against flexure than conventional multi-chambered containers do.

In order to achieve the above and other objects of the invention, a molding process is provided for making a plastic container that has more than one chamber and that is constructed so as to be stiffer than conventional molded multi-chambered containers. According to a first aspect of the invention, a parison is heated and inflated to form the container. Further, first and second pinched-in areas are fashioned in the sidewall of the container. The first pinched-in area includes first and second wall portions that extend inwardly toward an interior of the main body of the container, and a first end wall portion connecting the first and second wall portions. The second pinched-in area includes third and fourth wall portions that extend inwardly toward an interior of the main body, and a second end wall portion connecting the third and fourth wall portions. The first end wall portion is joined to said second end wall portion so as to define separate compartments within said main body, and wherein the first end wall portion is laterally offset from the second end wall portion, whereby the flexibility of the main body about the joint of the first and second wall portions is minimized. In the next step, the container is cooled.

According to a second aspect of the invention, the heated parison is inflated at the same time the pinched-in areas are fashioned. According to an additional aspect of the invention, the molding process is extrusion blow molding. According to another aspect of the invention, the mold used to make the container has pinch ribs extending into a mold cavity for forming the pinched-in areas.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIGS. 6A and 6B are views of the faces of two molds showing the mold cavity and the pinch ribs according to a preferred embodiment of the invention;

DETAILED DESCRIPTION OF THE PREFERRED EMBODIMENT(S)

Figure 1:
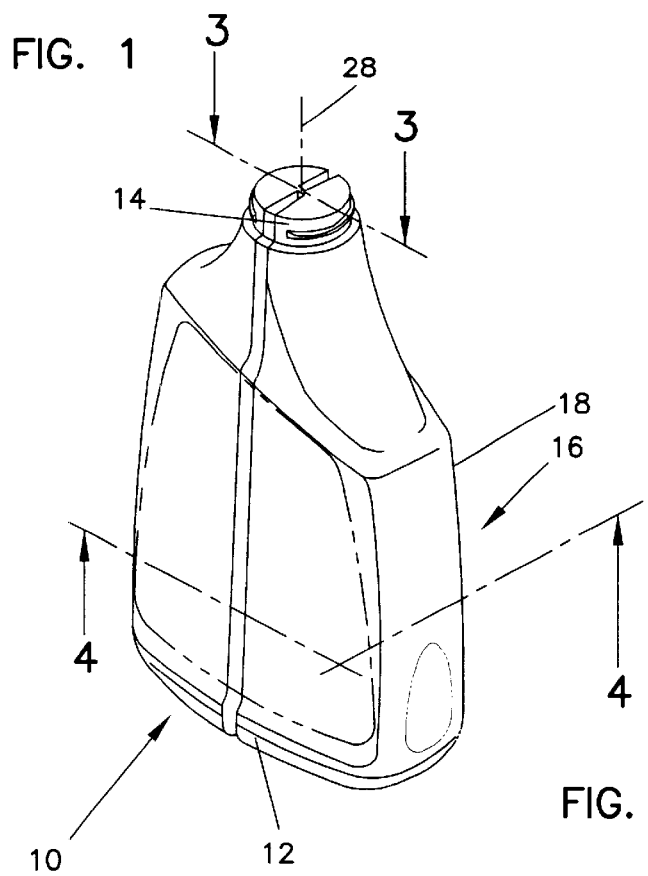
FIG. 1 is a perspective view of an improved plastic container that is constructed according to a preferred embodiment of the invention.

Referring now to the drawings, wherein like reference numerals designate corresponding structure throughout the views, and referring in particular to FIGS. 1–4, an improved plastic container 10 that has more than one chamber and that is constructed so as to be stiffer than conventional multi-chambered containers includes a bottom wall 12, a neck 14 and a main body 16. As may be seen in FIGS. 1–4, the main body 16 includes a sidewall 18 that has defined therein a first pinched-in area 20 and a second pinched-in area 22 that extends inwardly toward and is joined to the first pinched-in area 20 so as to define separate compartments 42, 44 within the main body 16. In the description that is given below, the container 10 extends in three different axes; a depth axis 24, shown in FIGS. 2 and 4, along which the depth of the container 10 can be measured; a width axis 26 also shown in FIGS. 2 and 4, along which the width of the container 10 can be measured; and a height axis 28, shown in FIG. 1, along which the height of the plastic container 10 can be measured, and that is coincidence with the longitudinal axis of the plastic container 10.

Figure 3:
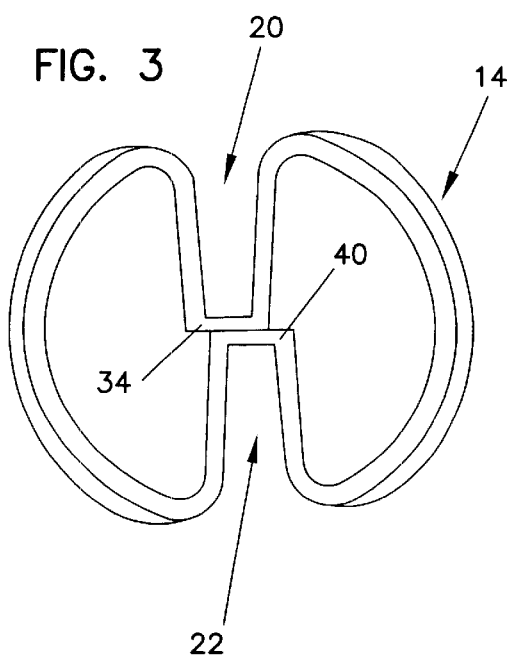
FIG. 3 is a cross-sectional view taken along lines 3—3 in FIG. 1.
Figure 4:
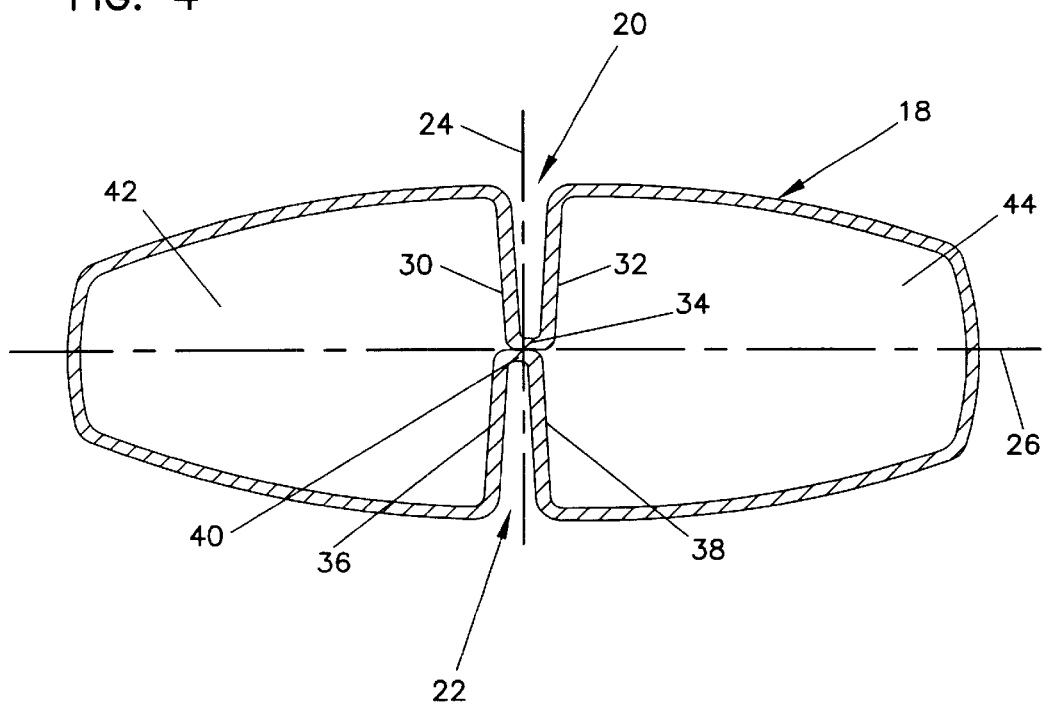
FIG. 4 is a cross-sectional view taken along lines 4—4 in FIG. 1.

As may best be seen in FIG. 4, the first pinched-in area 20 is characterized by a first wall portion 30 and a second wall portion 32, both of which extend inwardly (i.e., in a direction that is principally along the depth axis 24), toward an interior of the main body 16. A first end wall portion 34 connects the inward most extent of the first and second wall portions 30, 32 as may best be seen in FIGS. 3 and 4. Similarly, the second pinched-in area 22 includes a third wall portion 36 and a fourth wall portion 38, both of which extend inwardly along the depth axis 24 into the interior of the main body 16, and which have their inward most ends connected by a second end wall portion 40, as can be seen in FIGS. 3 and 4. The first end wall portion 34 is joined to the second end wall portion 40 so as to define the first and second compartments 42, 44.

Figure 2:
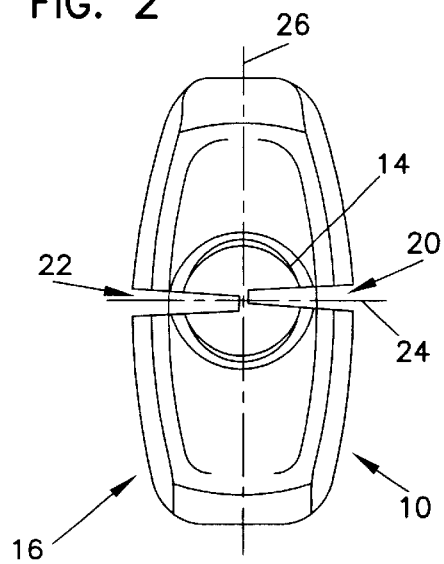
FIG. 2 is a top elevational view of the container that is depicted in FIG. 1.

One important aspect of the invention involves the fact that the first end wall portion 34 is slightly offset from the second end wall portion 40 (i.e., in the direction of the width axis 26, as may best be seen in FIGS. 2, 3 and 4) so as to minimize the potential for flexure of the container 10, or specifically the main body 16, at the joint that is formed between the first and second end wall portions 34, 40.

It should be understood that alternative structure could be used to minimize the potential for flexure of the container 10, and that such alternatives may equally be within the scope of the invention. For example, the two pinched-in portions could be offset to a degree that it is their sidewall portions that are joined, instead of the end walls. As an alternative to the offset structure, one endwall could be made larger than the other end wall.

Figure 5:
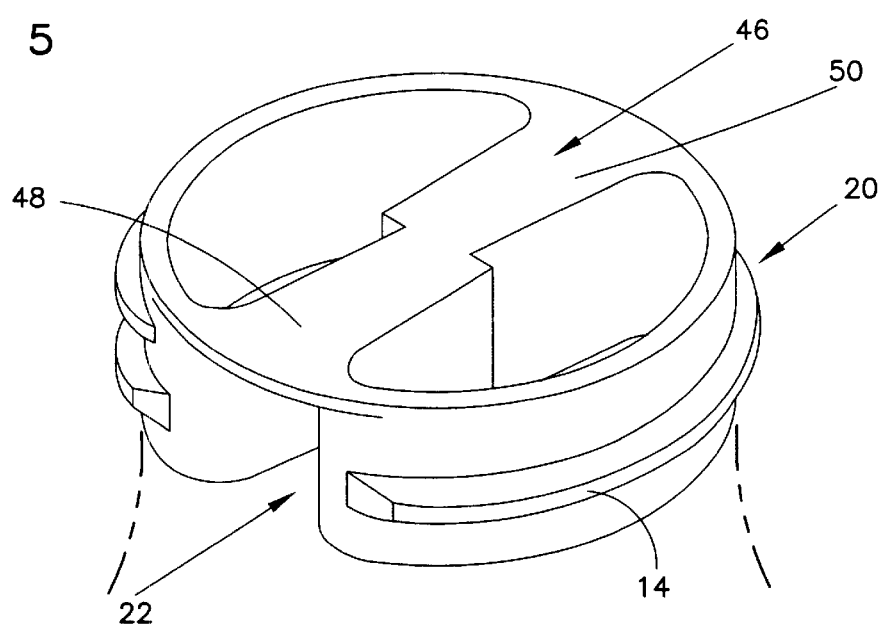
FIG. 5 is a fragmentary view of an upper portion of the neck of the container depicted in FIGS. 1–4.

As may be seen in FIGS. 1 and 3, the container 10 is constructed so that the first and second pinched-in areas 20, 22 extends into the neck 14 of the container 10. Another important aspect of the invention involves the fact that structure is provided for reinforcing the neck 14 against collapse as a result of the pinched-in areas 20, 22 when radial compressive pressure is applied to the neck 14 such as will occur when a closure or a spray cap is fitted onto the neck 14. In the preferred embodiment of the invention, shown in FIG. 5, this structure for reinforcing the neck against collapse involves the presence of a web 46 positioned near the top of the neck 14, which joins together and prevents flexure of at least one first pinched-in area 20 and the second pinched-in area 22. In the most preferred embodiment of the invention, the web 46 includes a first web portion 48 and a coextensive second web portion 50, which together prevent flexure of both the first pinched-in area 20 and the second pinched-in area 22.

The process for producing the multi-chambered container in the preferred embodiment is the same as for other extrusion blow molding processes except for forming the pinched-in areas of the container. A parison is heated and engaged in a mold cavity formed by two mold halves and inflated with air delivered through a blow pin or needle. As the parison is inflated, it takes on the shape of the mold cavity. The polymer quickly solidifies upon contacting the cold mold, and the finished hollow article is ejected from the mold.

Referring to FIGS. 6A and 6B, a mold having first and second mold halves 100 and 102 with pinch ribs 104 and 106, respectively, is used to form the pinched-in areas of the container. The first mold half 100 has a face 108 with an interior mold surface 110 defining a first cavity half 112. The pinch rib 104 extends into the first cavity half 112 from the interior mold surface 110. The pinch rib 104 has opposing first and second side surfaces 114 and 116 and an end surface 118 connecting the side surfaces. Further, the pinch rib 104 is offset from the height axis 200. The first mold half 100 is made up of a body 132 with a base insert 134 below it and a neck insert 136 above it. Further, a trim portion 138 is above the neck insert 136. The base insert 134 contains the base portion 140 of the interior mold surface 110 and it is generally perpendicular to the face 108. The body 132 contains the sidewall portion 142 of the interior mold surface 110 that extends from the base portion 140 to the neck insert 136. The neck insert 136 contains the neck portion 144 of the interior mold surface 110. The pinch rib 104 extends from the base portion 140, the sidewall portion 142 and the neck portion 144 in a preferred embodiment.

The second mold half 102 has a face 120 with an interior mold surface 122 defining a second cavity half 124. The pinch rib 106 extends into the second cavity half 124 from the interior mold surface 122. The pinch rib 106 has opposing first and second side surfaces 126 and 128 and an end surface 130 connecting the side surfaces. Further, the pinch rib 106 is offset from the height axis 200. The second mold half 102 is made up of a body 146 with a base insert 148 below it and a neck insert 150 above it. Further, a trim portion 152 is above the neck insert 150. The base insert 148 contains the base portion 154 of the interior mold surface 122 and it is generally perpendicular to the face 120. The body 146 contains the sidewall portion 156 of the interior mold surface 122 that extends from the base portion 154 to the neck insert 150. The neck insert 150 contains the neck portion 158 of the interior mold surface 122. The pinch rib 106 extends from the base portion 154, the sidewall portion 156 and the neck portion 158 in a preferred embodiment.

Figure 7:
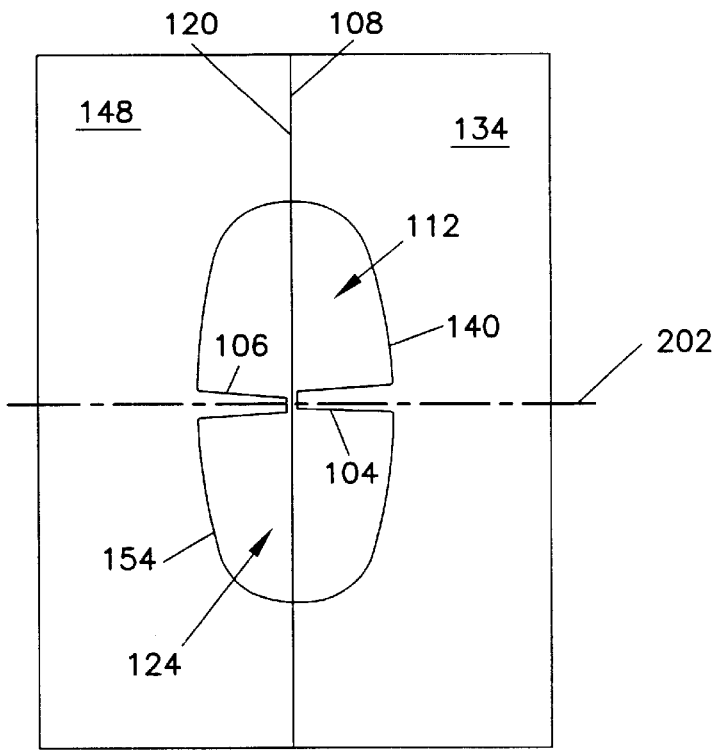
FIG. 7 is a cross-sectional view taken along lines 7—7 in FIGS. 6A and 6B as if the mold halves are aligned.
Figure 8:
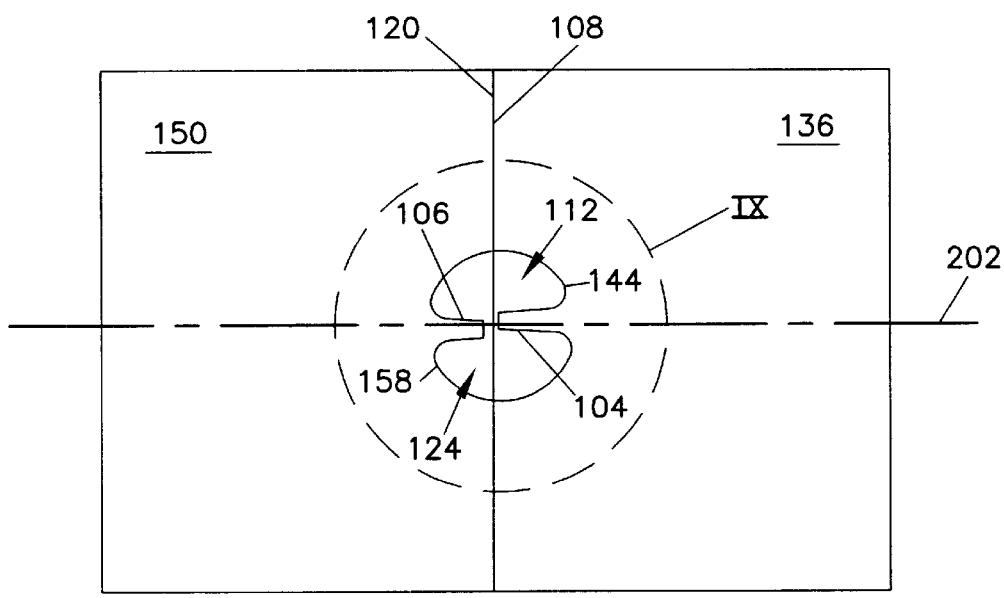
FIG. 8 a cross-sectional view taken along lines 8—8 in FIGS. 6A and 6B as if the mold halves are aligned.
Figure 9:
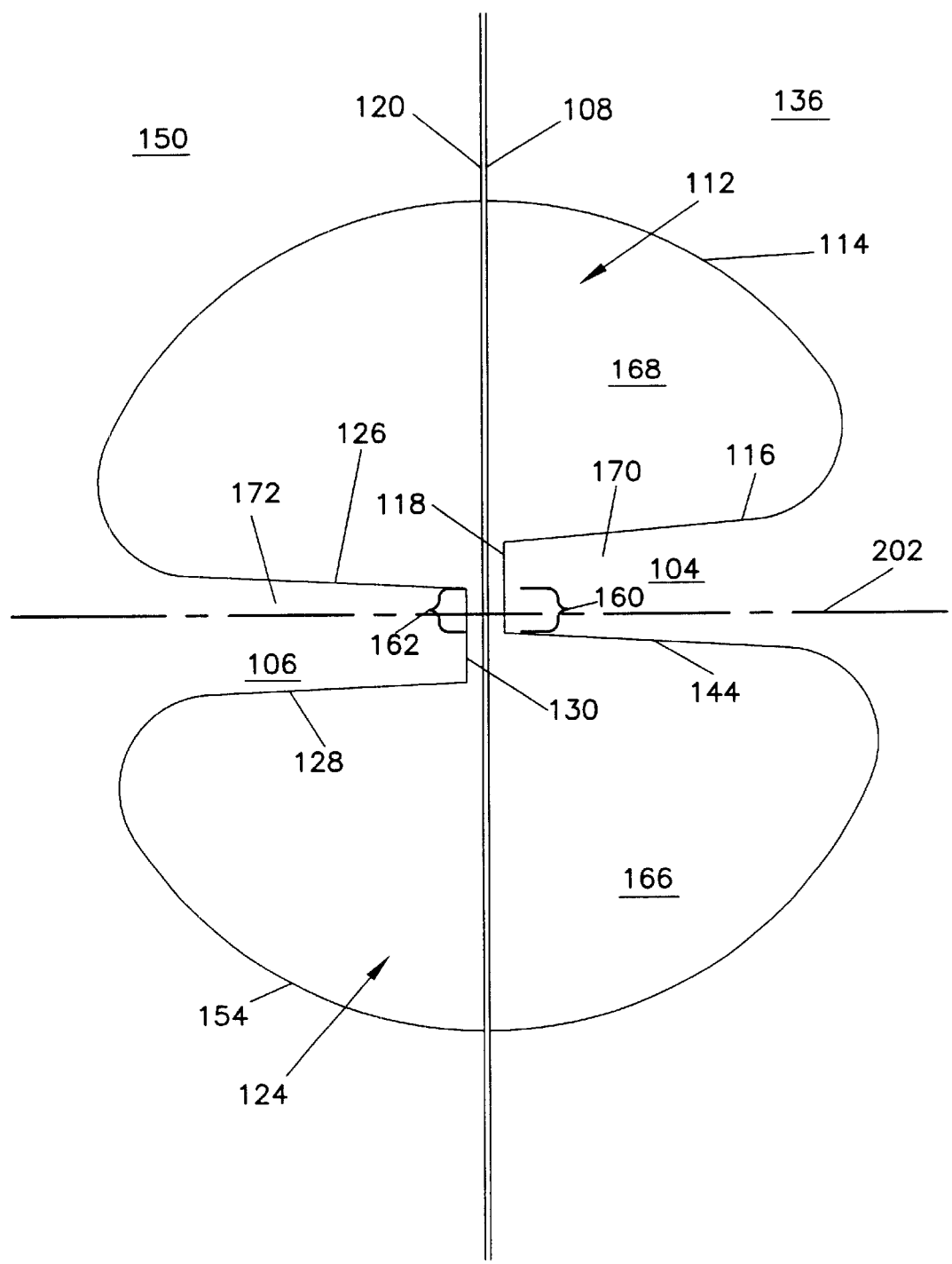
FIG. 9 is a detail view of area IX in FIG. 8.

Now referring to FIGS. 7, 8, and 9, when faces 108 and 120 are aligned, the pinch ribs 104 and 106 approach each other but do not contact. These pinch ribs form the first and second end wall portions 34 and 40 in the container. Also, the pinch ribs are offset from the depth axis 202 such that only a portion 160 of the pinch rib 104's end surface 118 faces only a portion 162 of the pinch rib 106's end surface 130. Also, when the faces are aligned, the interior cavity halves 112 and 124 correspond to form a mold cavity 164 with the pinch ribs separating two chambers 166 and 168 of the mold cavity. Other embodiments of the invention may have more than two chambers. Additional embodiments of the invention may have the offset pinch ribs 104 and 106 being located away from the height axis 200 and the depth axis 202 to form chambers of differing sizes. Still further embodiments of the invention may have non-vertically oriented or curved pinch ribs to form chambers of differing shapes.

The pinch ribs 104 and 106 have top surfaces 170 and 172, respectively, at the top of the neck inserts 136 and 150. These top surfaces 170 and 172 extend perpendicularly from their respective neck portions 144 and 158 and define a plane 174, when the mold faces are aligned, that is perpendicular to the height axis 200. The top surfaces 170 and 172 form the web 46 of the container during the molding process.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A multi-chambered plastic container, comprising:
   a bottom wall;
   a neck; and
   a main body, the main body having a sidewall that is connected to the bottom wall and the neck, wherein the sidewall defines:
      a first pinched-in area that includes first and second wall portions that extend inwardly toward an interior of the main body, and a first end wall portion connecting the first and second wall portions; and
      a second and discrete pinched-in area that includes third and fourth wall portions that extend inwardly toward the interior of the main body, and a second end wall portion connecting the third and fourth wall portions, the second end wall being separate and distinct from the first end wall portion, the first end wall portion being joined to the second end wall portion so as to define separate compartments within the main body; and
   a reinforcing structure diametrically situated in at least a portion of the neck.

2. The container of claim 1, wherein the first end wall portion is heat fused to the second end wall portion.

3. The container of claim 1, wherein the first and second pinched-in areas further extend into the neck.

4. The container of claim 1, wherein the first and second pinched-in areas terminate at about the neck.

5. The container of claim 1, wherein the first and second pinched-in areas have top surfaces, the top surfaces being perpendicular to the longitudinal axis of the neck.

6. The container of claim 5, wherein the top surfaces form at least a portion of the reinforcing structure.

7. The container of claim 5, wherein the top surfaces contact at least a portion of the reinforcing structure.

8. The container of claim 1, wherein the reinforcing structure is a web.

9. The container of claim 8, wherein the web is positioned substantially within a plane that is perpendicular to a longitudinal axis of the neck.

10. The container of claim 8, wherein the web is positioned substantially within a plane that is perpendicular to a plane formed by the first and second joined end wall portions.

11. The container of claim 1, wherein the reinforcing structure serves to reinforce the neck against collapse as a result of the pinched-in areas when radial compressive pressure is applied.

12. A multi-chambered plastic container, comprising:
    a bottom wall;
    a neck; and
    a main body, the main body having a sidewall that is connected to the bottom wall and the neck, wherein the sidewall defines:
       a first pinched-in area that includes first and second wall portions that extend inwardly toward an interior of the main body, and a first end wall portion connecting the first and second wall portions; and
       a second and discrete pinched-in area that includes third and fourth wall portions that extend inwardly toward the interior of the main body, and a second end wall portion connecting the third and fourth wall portions, the second end wall being separate and distinct from the first end wall portion; and a reinforcing structure diametrically situated in at least a portion of the neck;
    wherein one of the first and second wall portions of the first pinched-in area is joined to one of the third and fourth wall portions of the second pinched-in area so as to define separate compartments within the main body, and wherein the first and second end wall portions reside in the separate compartments.

13. The container of claim 12, wherein at least part of the first wall portion is joined to at least part of the fourth wall portion.

14. The container of claim 12, wherein at least part of the second wall portion is joined to at least part of the third wall portion.

* * * * *

UNITED STATES PATENT AND TRADEMARK OFFICE
CERTIFICATE OF CORRECTION

PATENT NO. : 6,390,324 B1  Page 1 of 1
DATED : May 21, 2002
INVENTOR(S) : Everette et al.

It is certified that error appears in the above-identified patent and that said Letters Patent is hereby corrected as shown below:

<u>Title Page,</u>
Item [56], References Cited, U.S. PATENT DOCUMENTS, insert:

| | | | |
|---|---|---|---|
| -- D255,776 | 7/1980 | Britt ................... | D9/60 |
| D271,856 | 12/1983 | Suhajda et al. ........ | D9/375 |
| D287,227 | 12/1986 | Turnbull .............. | D9/36 |
| D331,195 | 11/1992 | Weckman ............. | D9/543 |
| D342,022 | 12/1993 | Pritchard............... | D9/341 |
| D367,005 | 2/1996 | Warrilow ............. | D9/341 |
| 4,925,066 | 5/1990 | Rosenbaum .......... | 222/192 |
| 5,152,431 | 10/1992 | Gardner et al... ........ | 222/136 |
| 5,337,921 | 8/1994 | Wilson et al... ......... | 222/105 |
| 5,402,916 | 4/1995 | Nottingham et al. ... | 222/134 |
| 5,928,681 | 7/1999 | Everette et a1... ....... | 425/525 |
| 5,971,197 | 10/1999 | Everette et a1... ....... | 220/555 -- |

Signed and Sealed this

Fifteenth Day of April, 2003

JAMES E. ROGAN
*Director of the United States Patent and Trademark Office*